US008751474B2

(12) United States Patent
Ogilvie et al.

(10) Patent No.: US 8,751,474 B2
(45) Date of Patent: *Jun. 10, 2014

(54) CARD CUSTOMIZATION BY TAILORED INTERGENERATIONAL HISTORIC SNAPSHOTS

(71) Applicants: John W. Ogilvie, Salt Lake City, UT (US); Kristy Lyn Ogilvie, Salt Lake City, UT (US)

(72) Inventors: John W. Ogilvie, Salt Lake City, UT (US); Kristy Lyn Ogilvie, Salt Lake City, UT (US)

(73) Assignee: John Ogilvie, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/679,952

(22) Filed: Nov. 16, 2012

(65) Prior Publication Data

US 2013/0080866 A1 Mar. 28, 2013

Related U.S. Application Data

(63) Continuation-in-part of application No. 13/590,742, filed on Aug. 21, 2012, now Pat. No. 8,341,139, which is a continuation-in-part of application No. 13/527,553, filed on Jun. 19, 2012, now Pat. No. 8,538,945, which is a continuation of application No. 12/244,570, filed on Oct. 2, 2008, now Pat. No. 8,224,817.

(60) Provisional application No. 61/679,694, filed on Aug. 4, 2012, provisional application No. 61/678,162, filed on Aug. 1, 2012, provisional application No. 61/012,430, filed on Dec. 8, 2007.

(51) Int. Cl.
*G06F 7/00* (2006.01)
*G06F 17/30* (2006.01)

(52) U.S. Cl.
USPC ............. 707/706; 707/732; 709/206

(58) Field of Classification Search
CPC ............ G09F 1/04; H04N 2201/3214; H04N 2201/3215
USPC ........................................ 707/706
See application file for complete search history.

(56) References Cited

U.S. PATENT DOCUMENTS 5,340,317 A 8/1994 Freeman
6,249,807 B1 6/2001 Shaw et al.
(Continued)

OTHER PUBLICATIONS

"1000memories is the new shoebox for your old photos", retrieved from <<http://1000memories.com/about>>, retrieved Aug. 13, 2012, 2 pages. (filed in U.S. Appl. No. 13/590,742, filed Aug. 21, 2012).

(Continued)

*Primary Examiner* — Pavan Mamillapalli
(74) *Attorney, Agent, or Firm* — Ogilvie Law Firm

(57) ABSTRACT

A user-customized card includes a tailored intergenerational historic snapshot message which informs a younger person about the world an older person lived in when they were young. The older person's age and the younger person's age may be used to identify a historic time period in which the older person was the same age as the younger person. A circumstance which occurred in the historic time period may be selected from a database or web search result. The message may be tailored to the ages of the people involved. The message may also be tailored to recite circumstances specific to a topic area or a geographic location. The message may be used in the text generally, and in photo captions specifically, for example. The card may be a greeting card, birthday card, gift card, or other card. Items other than cards may also be customized with such a message.

20 Claims, 6 Drawing Sheets

(56) References Cited

U.S. PATENT DOCUMENTS

| | | | |
|---|---|---|---|
| 6,763,342 B1 | 7/2004 | Mattern et al. | |
| 7,337,172 B2* | 2/2008 | Shapiro | 707/999.01 |
| 7,391,314 B2 | 6/2008 | Lemmon | |
| 2002/0042846 A1 | 4/2002 | Bottan et al. | |
| 2002/0052768 A1* | 5/2002 | Walker et al. | 705/7 |
| 2003/0033296 A1 | 2/2003 | Rothmuller et al. | |
| 2004/0072129 A1 | 4/2004 | Arnoldy | |
| 2004/0133465 A1 | 7/2004 | Koge et al. | |
| 2004/0203622 A1 | 10/2004 | Esque et al. | |
| 2005/0033735 A1* | 2/2005 | Shapiro | 707/3 |
| 2006/0031121 A1 | 2/2006 | Speicher | |
| 2006/0190440 A1 | 8/2006 | Horvitz et al. | |
| 2007/0168368 A1 | 7/2007 | Stone | |
| 2007/0244900 A1 | 10/2007 | Hopkins et al. | |
| 2008/0091444 A1 | 4/2008 | Moore | |
| 2008/0294663 A1 | 11/2008 | Heinley et al. | |
| 2013/0248606 A1* | 9/2013 | Beadles et al. | 235/487 |

OTHER PUBLICATIONS

"Get Organized On-The-Go", retrieved from <<http://www.aboutone.com/product-tour/mobile-apps/google-android-app/>>, retrieved Aug. 13, 2012, 3 pages. (filed in U.S. 13/590,742, filed Aug. 21, 2012).

"JustFamily", retrieved from Apple iTunes(R) store and from <<http://justfamily.com>> website, retrieved Aug. 13, 2012, 2 screenshots, 1 page. (filed in U.S. Appl. No. 13/590,742, filed Aug. 21, 2012).

"MobileTree: Family history for a mobile community", retrieved from <<http://mobiletree.me/mt_product_info.php>>, copyright date 2009, 1 page. (filed in U.S. Appl. No. 13/590,742, filed Aug. 21, 2012).

Brandon J. Heinley, U.S. Appl. No. 60/917,747, filed May 14, 2007 (filed in U.S. Appl. No. 13/590,742, filed Aug. 21, 2012).

"The White Rose", www.jirweb.com, Jul. 18, 2004 (filed in U.S. Appl. No. 13/590,742, filed Aug. 21, 2012).

John Ogilvie, "When Grandpa Ogilvie was your age . . . ", email with cover sheet, Nov. 17, 2007.

E. Jane Dickson, "Staying Afloat: 'When I was the same age as you,' I tell my daughter,", The London Independent, findarticles.com, copyright 2005 (filed in U.S. Appl. No. 13/590,742, filed Aug. 21, 2012).

Jan McClintock, "Beyond the Placename", www.leisterpro.com, copyright 1995-2007 (filed in U.S. Appl. No. 13/590,742, filed Aug. 21, 2012).

"SuperKids Humor pages. When I was your age . . . ", www.superkids.com, copyright 1998-2007 (filed in U.S. Appl. No. 13/590,742, filed Aug. 21, 2012).

Review of "When I Was Your Age, vol. One: Original Stories About Growing Up (When I Was Your Age)", www.amazon.com, Jun. 19, 2000 (filed in U.S. Appl. No. 13/590,742, filed Aug. 21, 2012).

"Ecards, Birthday Ecards, Printable Cards, Greeting Cards," Retrieved at <<http://www.egreetings.com/>>, Copyright date 1998-2012, 2 pages.

"Free Ecards | Online Cards, Birthday Cards and Greeting e cards," Retrieved at <<http://www.egreetings.com/>>, Copyright date 1998-2012, 2 pages.

"Invitations, Collages, Slideshows and Scrapbooks," Retrieved at <<http://smilebox.com/>>, no later than Nov. 16, 2012, 2 pages.

"Online Photo Greeting Cards: Printable, E-Cards Personalized," Retrieved at <<http://mycardmaker.com/>>, copyright date 2010, 1 page.

* cited by examiner

CARD CUSTOMIZATION BY TAILORED INTERGENERATIONAL HISTORIC SNAPSHOTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Some online services offer reminders of birthdays, anniversaries, and other life events. Some allow a user to create an electronic birthday card, sympathy card, anniversary card, or other greeting card. The electronic card may be based on a template, which is customized with text and photos provided by the user. The customized electronic card is then emailed to a recipient.

Some online and offline services allow a user to create a photobook, which is then published in electronic (e.g., PDF file, website) and/or non-electronic (e.g., printed paper) form. The photobook typically includes images supplied largely or entirely by the user, arranged on a background, as well as text supplied by the user such as image captions and a title, for example. The photobook is typically based on a template supplied by the service and customized by the user.

Genealogical databases available online may allow identification of ancestors going back multiple generations. Genealogy may begin with work identifying members of a family tree, but it often extends beyond mere lineage and location data into an investigation of the life events, living conditions, and personal history of one's ancestors. A family history is a narrative of the lives of people in a particular family. Personal correspondence, newspapers and other contemporaneous publications, legal records, religious records, and oral history narratives may each provide insight into someone's life years ago.

This background was drafted with the present invention in mind. One of skill would not necessarily have combined any or all of the concepts that are presented together here.

SUMMARY

A tailored intergenerational historic snapshot message helps inform a younger person about the world an older person lived in when they were young. For instance, a message may list several circumstances in the older person's life from a time when the older person was the same age as the younger person is now, such as technology advances or political events from that time period. In some embodiments, the older person's age and the younger person's age are first used to identify a historic time period in which the older person was the same age as the younger person. A circumstance which occurred in the historic time period is then selected from a database, web search results, or another data source. An intergenerational historic snapshot message is then generated, tailored to the ages of the older and younger persons. The message may also be tailored to describe circumstances specific to a topic area such as music or sports, or circumstances specific to a particular geographic location such as the older person's home town or the younger person's current state of residence. The tailored message informs the younger person about one or more circumstances that occurred when the older person was approximately the younger person's age, thereby helping the younger person better understand the world the older person lived in at the time.

In some embodiments, a customized birthday card, greeting card, or other customized card contains a tailored intergenerational historic snapshot message. A custom card can be produced using tools and techniques for producing a tailored intergenerational historic snapshot message, in suitable combination with techniques for producing familiar cards and other items, adapted for example to locate the message within the custom card in ways that allow the text and visual images to complement and support one another, per user selections. For example, the card may include a user-edited version of the message in some embodiments.

One method for producing a customized card includes obtaining digital values for parameters of a tailored historic snapshot message template data structure stored in a computer-readable memory. The template data structure has predefined text and parameters, and the text is interleaved with the parameters to form sentences. In some embodiments, the predefined text and parameters of the template data structure including at least one of the following pairs within a sentence: "from where you are" and a distance parameter, "was your age" and a familial relationship parameter, "when she/he turned" and a person's age parameter, "like to know" and a person's name parameter, "in the year" and a date parameter based on an elder person's birthdate and a younger person's age, "people in it" and a historic date population parameter, "population of" and a historic date population parameter, "just . . . invented" and a historic event parameter with the ellipsis representing text rather than being literal, "first successful" and a historic event parameter, "world . . . changed" and a person's age parameter, with the ellipsis representing text rather than being literal.

Some embodiments include generating by execution of code with a computer processor a tailored historic snapshot message from the parameters and the template data structure. Some include a version of the tailored historic snapshot message in an electronic version of the customized card. In some, the customized card contains text tailored for at least one of the following subjects: an anniversary, a birthday, a congratulation, a gift, a graduation, a seasonal greeting, a holiday, an expression of sympathy. Some customized cards are gift card.

Some embodiments split the tailored historic snapshot message across multiple pages of the customized card. In some, the card includes visual images, and the including step splits the message across multiple visual images of the card by using at least a respective portion of the message as at least one of the following for each respective visual image: a caption, a heading, a watermark, a displayed label, a text displayed on at least two sides of the visual image. Some embodiments use at least a portion of the message as a visual image caption in the card, and some use at least a portion of the message as an opening line of the card. Some include at least a portion of the message on a back page of the card.

In some embodiments, the card includes a photo of at least one of the following: the elder person, the younger person, the historic event. In some, the card includes a user-edited version of the message. Some customized cards include a photo and/or a name of a person whose age parameter is obtained in the obtaining step.

Some embodiments send the electronic version of the card to a printing service with an instruction to print at least one tangible copy of the card. The tailored historic snapshot message may be printed on the card using at least one of the following technologies: lithography, embossing, engraving, laser printing, ink jet printing, 3D printing, silk screening, for example. A resulting tangible custom card may be mailed to recipients, or picked up at a retailer, such as a retail chain store, for example.

In some cases, a user selects a layout template of the card which specifies at least one location in which text is permitted, and the message text appears in at least one location permitted by the layout template. Some embodiments receive a user selection of digital values for parameters of the tailored historic snapshot message template data structure through a web browser-based user interface, or an app-based user interface, in a smartphone, tablet, laptop, or other computing device.

In some cases, the message appears in at least one of the following cards which are also designed to be received by multiple recipients: a seasonal greeting card, a congratulatory card. In some, the card includes text referring to at least one of the following circumstances: a wedding, a moment in the life of a baby (namely, a person less than one year old), a moment in the life of a young child (one less than eleven years old), a family vacation, a travel adventure.

In some embodiments, the user places the message on at least one non-card item, such as a mug, mat, article of clothing, plaque, or other item. The message may also be placed in an email, or in a gift card which accompanies a gift (the gift itself does not necessarily bear the message, but it may).

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
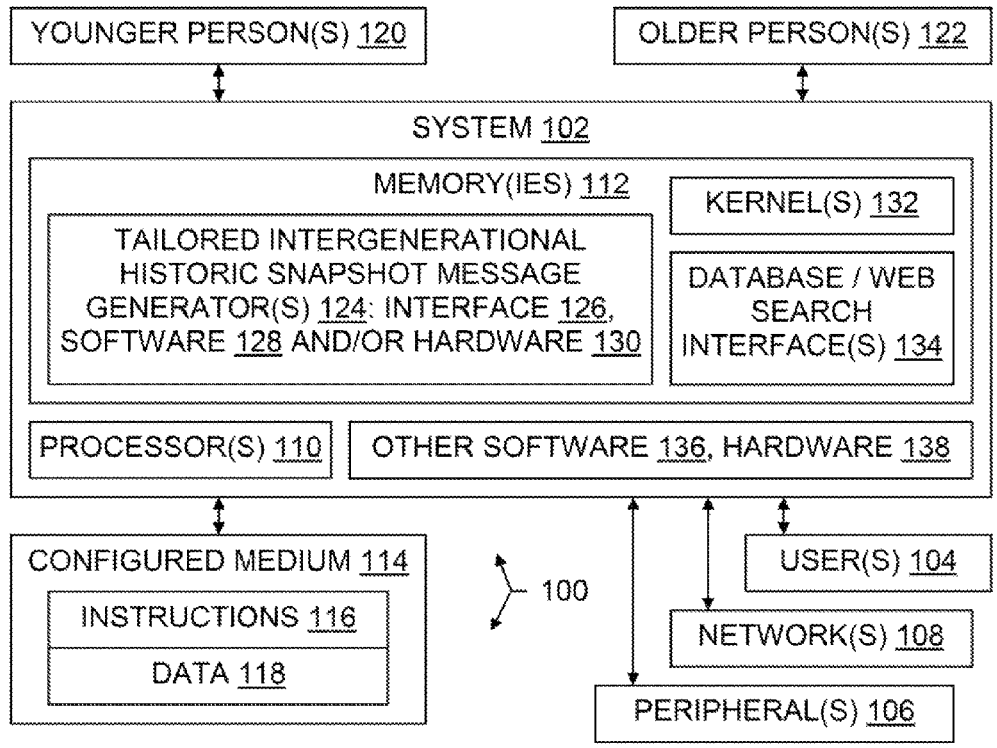
FIG. 1 is a block diagram illustrating a system having a memory configured with a tailored intergenerational historic snapshot message generator and other items in an operating environment, and also illustrating configured storage medium embodiments.

Embodiments described here provide tools and techniques for strengthening family bonds and helping people better understand the world in which their older family members grew up. In particular, some embodiments automatically create messages which can help a younger person connect with an older person by identifying historic events that occurred in the older person's world when the older person was the same age as the younger person is now. The selection of events identified can be tailored expressly by subject matter and/or filtered according to the age or location(s) of the people involved.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or machine(s) providing one or more processors controlled at least in part by instructions. The instructions may be in the form of software in memory and/or specialized circuitry. In particular, although it may occur that many embodiments run at least partially on workstation or laptop computers, other embodiments may run on other computing machines, and any one or more such machines may be part of a given embodiment. A computer system is sometimes simply referred to as a "system".

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreading may be implemented, for example, by running different threads on different cores in a multiprocessing environment, by time-slicing different threads on a single processor core, by running on more than one machine, and/or by some combination of time-sliced and multi-processor threading.

A "logical processor" or "processor" is a single independent hardware thread. For example a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors.

"Kernels" include operating systems, hypervisors, virtual machines, and similar hardware interface software.

"Code" means processor instructions, data (which includes data structures), or both instructions and data.

Whenever reference is made to data or instructions, it is understood that these items configure a computer-readable medium or other computer-readable memory, as opposed to simply existing on paper, in a person's mind, or as a transitory signal on a wire, for example. Claims do not cover mere propagated signals per se unless they expressly state that signals per se are part of the claimed subject matter.

A list may be "displayed" by a system visually, audibly, and/or tactilely.

A "circumstance" may be an event, or it may be a condition or state. For example, the first medical use of penicillin is an event, the price of a gallon of gasoline is an economic condition or state, and each of these is a circumstance.

"Personal history information" includes information pertaining to the circumstances of a particular person's life. Aspects of personal history information may be publicly known or previously recorded in publically accessible data sources, but personal history information also includes anecdotal, autobiographical narrative, and/or previously private information about the life of the person in question.

A "familial relationship" is a description of the relationship(s) between two or more people in a family, such as grandparent, cousin, aunt, uncle, father, mother, brother-in-law, sister-in-law, or the like.

A "family group" is particular example of a family. All people in a family group are related by blood, legal adoption, or marriage within a span of at most four generations.

Unless otherwise indicated, "age" means a person's age in years. An "indication" of a person's age means information from which the person's age can be calculated, such as the person's birth year, their full birth date, their age relative to another person whose age is known or can be calculated, or a statement of the person's age at a specified time.

Unless otherwise indicated, two ages are the "same" if they are within twelve months of each other. Similarly, unless otherwise indicated two ages are "approximately" the same if they are within three years of each other.

An event occurred "within" a period if any portion of the event occurred during the period.

A message "discloses" certain information if it makes that information clear to the message recipient, regardless of whether the recipient already knew some or all of the information being disclosed. The use of particular phrasing is not required in the message, so long as the information said to be disclosed is conveyed to the recipient. The message may also contain other information beyond the information said to be disclosed.

A message may be "electronically transmitted" via email, fax, blog posting, text message, synthesized voice communication, voicemail, or the like.

Throughout this document, use of the optional plural "(s)" means that one or more of the indicated feature is present. For example, "circumstance(s)" means "one or more circumstances" or equivalently "at least one circumstance".

Operating Environments

With reference to FIG. 1, an operating environment 100 for an embodiment may include a computer system 102. The computer system 102 may be a multiprocessor computer system, or not. An operating environment may include one or more computer systems, which may be clustered, client-server networked, and/or peer-to-peer networked. Some operating environments include a stand-alone (non-networked) computer system.

Human users 104 may interact with the computer system 102 by using displays, keyboards, and other peripherals 106. Automated agents may also be users 104. Storage devices and/or networking devices may be considered peripheral equipment in some embodiments. Other computer systems (not shown) may interact with the computer system 102 or with another system embodiment using one or more connections to a network 108 via network interface equipment, for example.

The computer system 102 includes at least one logical processor 110. The computer system 102, like other suitable systems, also includes one or more memories 112. The memories 112 may be volatile, non-volatile, fixed in place, removable, magnetic, optical, and/or of other types. In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a memory 112. Other examples of memory 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the memory 112/medium 114 in which they reside; when that memory is a functional part of a given computer system, the instructions 116 and data 118 also configure that computer system. Memories 112 may be of different physical types. Tailored intergenerational historic snapshot message generators 124 and other items shown in the Figures may reside partially or entirely within one or more memories 112, thereby configuring those memories.

Persons 120, 122 may submit information to the system 102 for use by a message generator 124 and/or may receive messages generated by the message generator 124.

The message generator 124 includes an interface 126 through which the message generator 124 receives information and commands, and provides generated messages. The message generator 124 may be implemented in software 128 and/or hardware 130. The illustrated message generator 124 accesses peripherals 106, networks 108, and other resources with the assistance of a kernel 132 such as an operating system. The illustrated message generator 124 uses interfaces 134 to access databases and web search engines to locate circumstance information. Other application programs and other software 136 and other hardware 138 (buses, power supplies, network interface cards, etc.) than that already enumerated may also be present.

In some embodiments, peripherals 106 such as human user I/O devices (screen, keyboard, mouse, microphone, speaker, motion sensor, etc.) will be present in operable communication with one or more processors 110 and memory 112. In some embodiments, networking interface equipment provides access to networks 108, using components such as a packet-switched network interface card, a wireless transceiver, or a telephone network interface, for example, will be present in the computer system. However, an embodiment may also communicate through direct memory access, removable nonvolatile media, or other information storage-retrieval and/or transmission approaches, or an embodiment in a computer system may operate without communicating with other computer systems.

Systems

Figure 2:
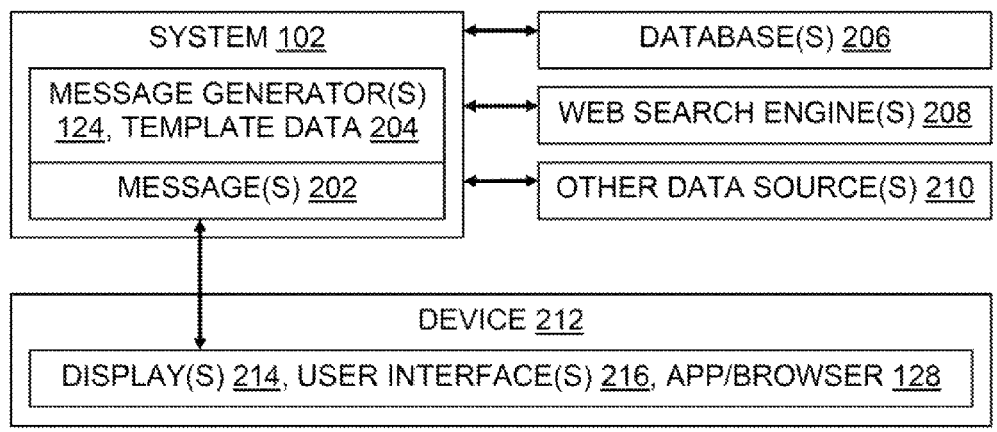
FIG. 2 is a block diagram illustrating a configuration in which tailored intergenerational historic snapshot messages are generated on a system which communicates with users through a remote device.

Referring now to FIGS. 1 and 2, some embodiments provide a system 102 having a processor 110 in operable communication with a memory 112 that contains a message generator 124 and/or messages 202 generated by a message generator 124. In some embodiments, data 204 such as selected circumstances, personal history information, topical preferences, geographic location information, age indications, usernames, passwords, and/or email addresses are also present in memory 112. Some embodiments are configured to select circumstances by querying one or more databases 206, using topics, geographic locations, and/or time periods as keys or indexes.

Some embodiments are configured to select circumstances by contacting one or more web search engines 208, using topics, geographic locations, and/or time periods as search terms. Some embodiments use other data sources 210, such as recorded anecdotes, photographs supplied by a user, and/or text supplied by a user, when generating messages 202. Photographs may be supplied as PDF, TIFF, JPEG, or other graphics-format-capable files, for example.

The configuration illustrated in FIG. 2 includes a remote device 212, such as a computer network client or a mobile phone or other local system 102 which is in communication (intermittent or continuous) with a remote system 102 such as a server. In this configuration, the remote device(s) 212 act mainly to provide displays 214 and other interfaces 216 engaged by a user 104 and/or other persons 120, 122, while the remote system 102 selects circumstances and otherwise generates messages 202.

Examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

Bearing these caveats in mind, in some embodiments an email message 202 or other message 202 is automatically generated by the generator 124 and sent to one or more persons 120, 122, 104. In one embodiment, the email message has the following general format:

To: <Younger>
From: <Caregiver>
Cc: <Elder>
Subject: "When <Elder> was your age . . . ."

"Dear <Younger>, I thought you might like to know some ways the world has changed since <Elder> was your age. When <Elder> was <Younger Age>, in the year <Elder Birthdate+Younger Age>, <Subject-specific event recitation(s)>. Love, <Caregiver>"

For example, a parent might subscribe to a service which automatically generates and sends to the parent's child, each year on the birthday of the child's grandparent, an email reminder message 202 about the grandparent's birthday which also describes a historic event that occurred the year the grandparent was the same age as the child currently is. In the FIG. 1 configuration, the parent acts as a user 194, the child is a younger person 120, and the grandparent is an older person 122. The historic event could be from a topic-specific chronological database 206 of events, with the topic (sports, technology, music, etc.) specified by the parent.

In some embodiments, multiple people can be involved, e.g., two or more <Elder> persons 122 in one message 202, two or more <Younger> persons 120 in one message 202, and some people could be Bcc'd as well as Cc'd. In some embodiments, other people familiar to <Younger> also provide snapshot ages, e.g., "When Uncle Bob was your age (11), <X> had just been invented, and when Uncle Bob was your brother's age (14), <Y> made the first successful <Z>."

In some embodiments, an <age> is defined by input data 204 in the form of a complete birthdate (day, month, and year), a partial birthdate (month and year, season and year, or year, for example), and/or an age (specified, e.g., in years).

In some embodiments, a subject database 206 from which an event is chosen contains event listings pertaining to a relatively broad topic, such as sports, politics, religion, fashion, or the like. In some embodiments, the subject database 206 is relatively narrow, e.g., containing events in Rock & Roll History, events in the life of one or more specified celebrities or other famous persons, numismatic events such as coin mintings, and so on. In some embodiments, topical keywords are included in web search engine 208 queries to provide a similar effect, namely, obtaining circumstance description(s) pertinent to particular specified topic(s).

In some embodiments, in place of or in addition to an automatically generated email message 202, a message 202 is automatically generated in another format, e.g., cell phone text message, synthesized voice recording, online instant message, visual text and graphics, photo book content, customized card content, other item customization, and so on. As used herein, "visual images" that may be included in a book 504, card 1000, or on another customized item means photos, clip art, other graphics, and other visible content which is not primarily textual in nature. Visually perceptible content is thus partitioned into that which is (at least primarily) text and that which is visual image(s). Some content, such as calligraphed Japanese kanji, may be categorized as textual by someone who is fluent in Japanese and as a visual image by someone who is not.

In some embodiments, GPS technology, geolocation tools, and/or other location-approximating technology is used and results are incorporated into the event database 206 lookup, the web search engine 208 query, and/or the text or images in the generated message 202. Former geographic location(s) and other personal history of the <Elder> and/or other people may also be used in generating messages 202. For example, messages such as the following might be automatically generated:

"When Grandpa was your age, he lived <distance> miles from where you are right now."
"When Uncle Fred was your age, <Metropolis> only had <population at the time of closest census date to historic date> people in it. A car cost <historic cost at about that historic date>, but a full day of hard work only paid <historic wage>".

"On your Grandmother's birthday when she turned <same age as child is now>, the <local city> newspaper front page headline was '<headline>.'"

In some embodiments, the message 202 is automatically generated and sent to a subscriber user first, e.g., a parent, and is subsequently sent to the <Younger> only if the subscriber approves of the message content. In some embodiments, a subscriber user such as a <Caregiver> has the option of editing the automatically generated message before it is sent (by the system or by the subscriber, as the case may be) on to anyone else.

In some embodiments, the message is automatically generated and sent on a specified date, such as an <Elder> birthday, a <Younger> birthday, or a <Caregiver> birthday.

Embodiments may be configured in various ways, e.g., as processes and/or hardware on a server computer, on a client or peer, or on a standalone computer, software (data instructions) in RAM or permanent storage for performing a process, with general purpose computer hardware configured by software, special-purpose computer hardware, data produced by a process, and so on. Computers, PDAs, cell phones, and any other device 212 having user interface and some network transmission capabilities may be part of a given embodiment. Touch screens, keyboards, other buttons, levers, microphones, speakers, light pens, sensors, scanners, and other I/O peripheral 106 devices may be configured to facilitate or perform operations to achieve the methods and systems, and method results, which are described here. Combinations of these may also form a given embodiment. Terms such as "computerized" refer to devices having a microprocessor and memory, not merely to personal computers or servers. "Electronic" refers to digital and/or analog electronic circuitry. "Automatic" means without requiring ongoing real-time human input or guidance to perform the immediately contemplated operation.

Methods

Figure 3:
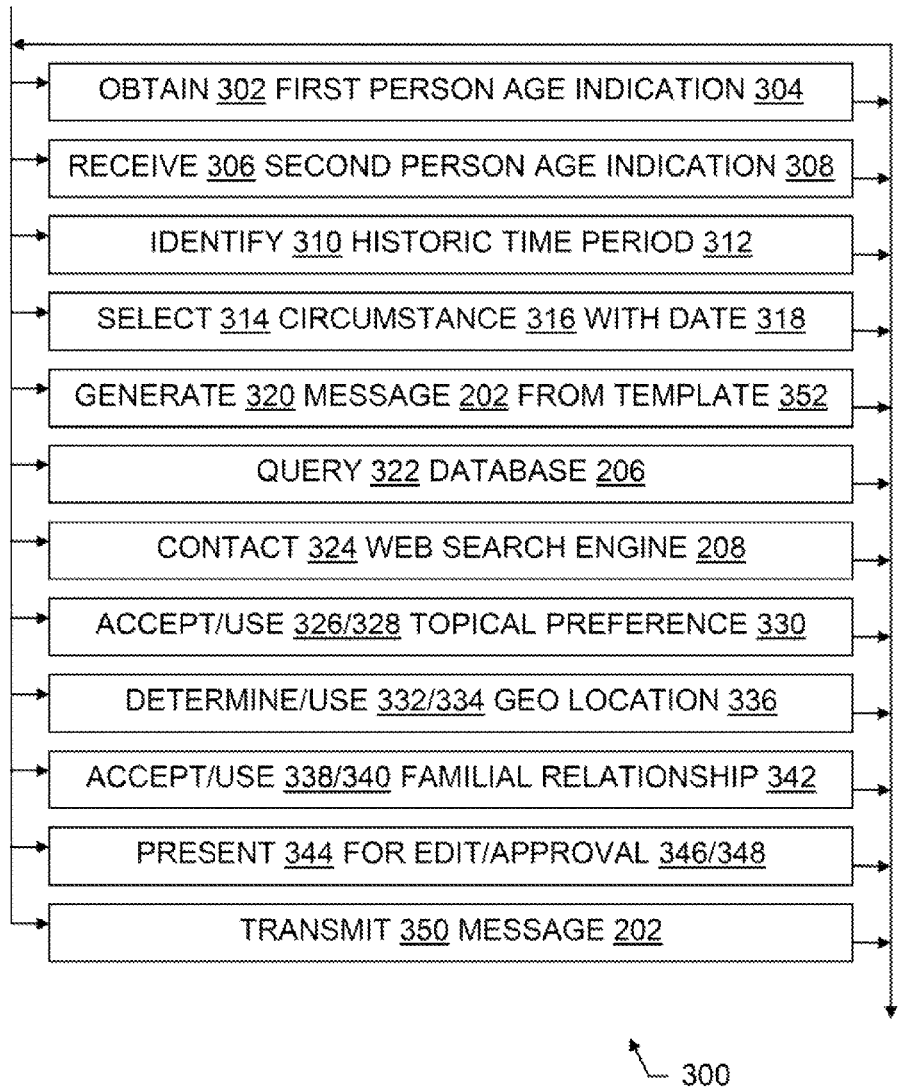
FIG. 3 is a flow chart illustrating steps of some method and configured storage medium embodiments, from a system perspective.
Figure 4:
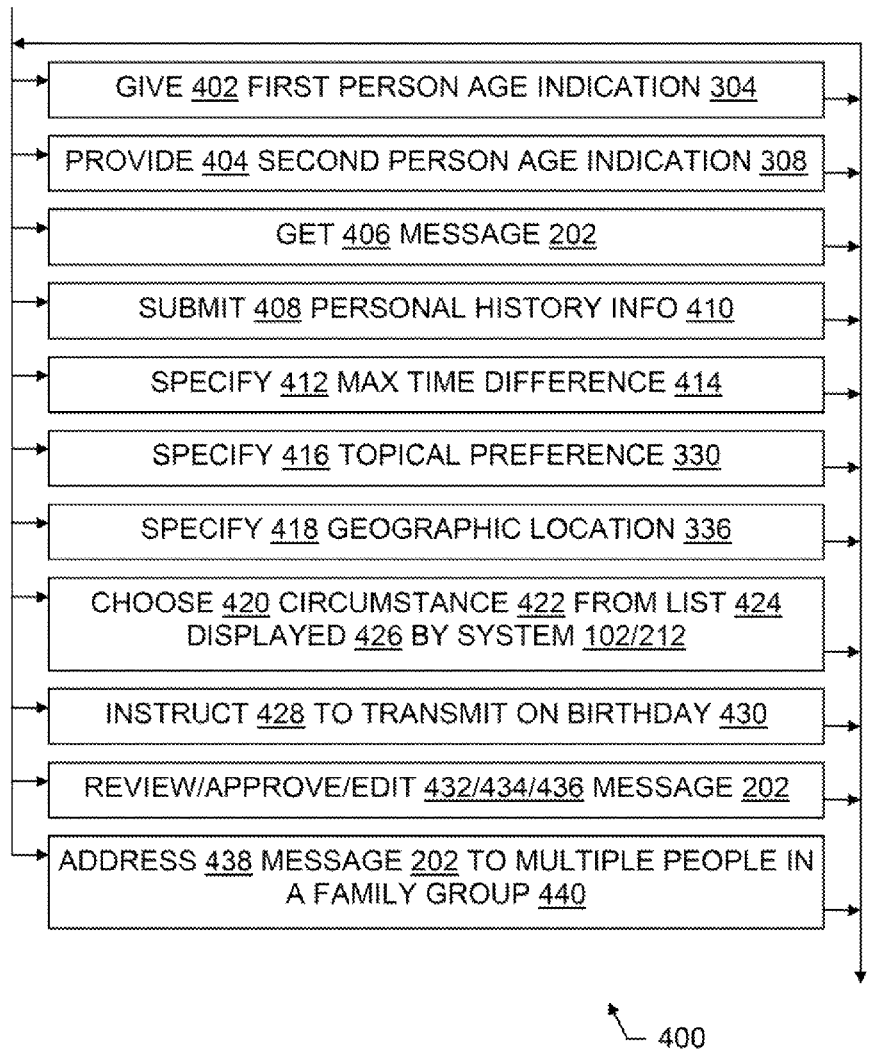
FIG. 4 is a flow chart illustrating steps of some method and configured storage medium embodiments, from a user perspective.
Figure 5:
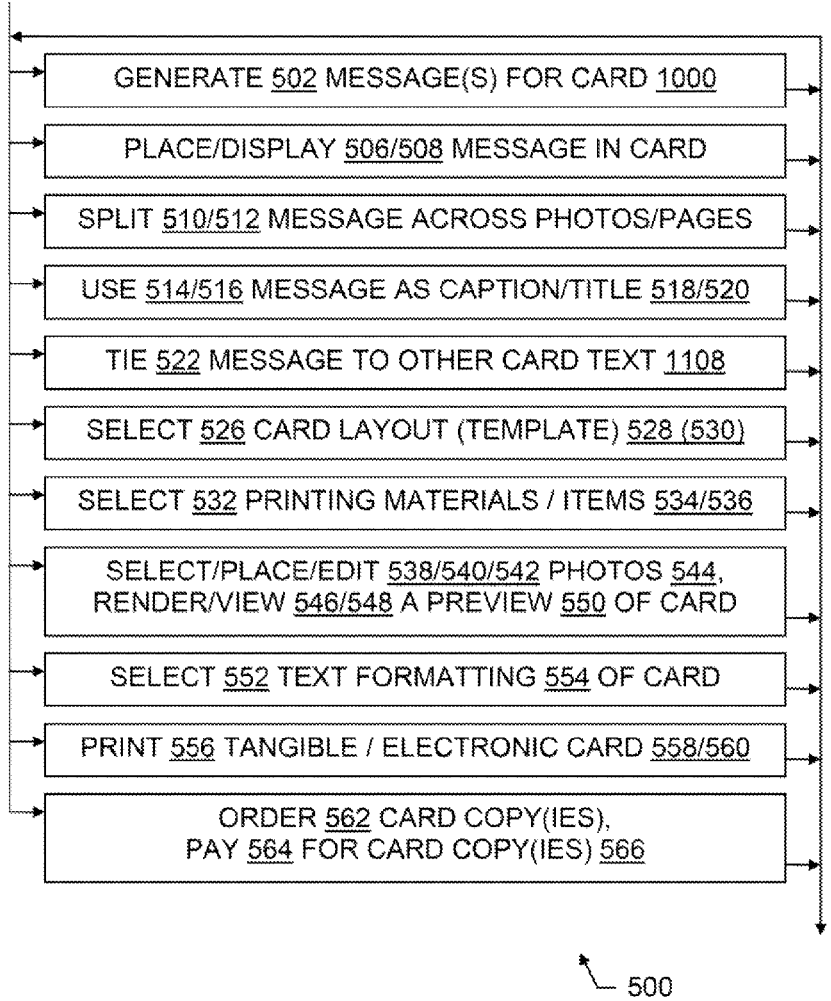
FIG. 5 is a flow chart illustrating steps of some method and configured storage medium embodiments, from a system and/or user perspective, with particular attention to tailored intergenerational historic snapshot messages embedded in cards.

FIGS. 3 to 5 illustrate some method embodiments, in flowcharts 300, 400, and 500, respectively. Methods shown in the Figures may be performed in some embodiments automatically, e.g., by a message generator 124 that has been initialized with data 204 and designed to operate with little or no further user input. Methods may also be performed in part automatically and in part manually unless otherwise indicated.

In a given embodiment zero or more illustrated steps of a method may be repeated, perhaps with different parameters or data to operate on. Steps in an embodiment may also be done in a different order than the top-to-bottom order that is laid out in FIGS. 3, 4, and 5. Steps may be performed serially, in a partially overlapping manner, or fully in parallel. The order in which a flowchart is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flows, provided that the method performed is operable and conforms to at least one claim. A given method may include steps from one or more of these Figures, or from the text.

FIG. 3 illustrates some steps from the perspective of a configured computer system, device, or other embodiment.

During an obtaining step 302, an embodiment obtains an indication 304 of a first person's age, such as their birth date (the current date is implicitly known) or a statement that they are N years old, for some value of N, for example. The indication 304 may be obtained interactively through a GUI or other user interface, or received through a network transmission, or read from a file, for example.

During a similar receiving step 306, the embodiment receives another age indication, namely an indication 308 of a second person's age. The same type of mechanisms and procedures may be used in receiving step 306 as in obtaining step 302. It will also be understood that the order in which the age indications are received is not critical—the younger person's age may be indicated to the embodiment before the older person's age is indicated, or vice versa, or the two may be indicated together.

During an identifying step 310, an embodiment identifies a historic time period 312 in which the older person was approximately the same age as the younger person's age. As one example, if the persons' ages are 88 and 18, time periods are each two years long, and the current year is 2008, then by arithmetic calculation step 310 could identify 1936-1938 or 1938-1940 as a suitable historic time period (calculate 2008 minus 88 plus 18 to get 1938 and then select a period that includes 1938). As another example, if the persons' ages are 53 and 13, time periods are each one year long, and the current year is 2008, then by arithmetic calculation step 310 could identify 1968 as a suitable historic time period (2008 minus 53 plus 13 equals 1968). Historic time periods need not all be of the same duration, and may be measured in units other than years; period descriptors could be stored in a list or table and selected based on their beginning and ending dates. In some embodiments, a historic time period has a span (e.g., beginning date and ending date, or beginning date and length) and a list describing circumstances 316 which occurred during the period. Each circumstance description includes a textual, visual, and/or audible portion for potential inclusion in a message 202. Each circumstance may include topical markers (sports, politics, technology, etc.), and may have an associated geographic occurrence location (city, state, region, province, country, etc.). In addition to being associated with a historic time period, the circumstance may also have a displayable specific occurrence date within the period's span.

During a selecting step 314, an embodiment selects a circumstance 316 from a time period 312. The circumstance has a date 318, which may be either the time period's span or a more specific occurrence date within that span. Selection may be made completely randomly from the circumstances associated with the time period 312, or selection may be based at least in part on topical markers and/or geographic location and/or specific occurrence date, for example.

During a generating step 320, an embodiment generates a message 202 by using a template (procedural, textual, XML/HTML, etc.) 352 which the embodiment fills in with selected circumstance descriptions, age indications, recipient and other persons' names, and destination addresses, for example.

During a querying step 322, an embodiment queries a database 206 of circumstances to obtain one or more circumstance descriptions to insert in a message 202. The query may key off values such as the historic time period, topical preferences (enumerated categories and/or free-form keyword searches), and geographic locations in which circumstances occurred.

During a web search engine contacting step 324, an embodiment contacts a web search engine 208 with a search request to obtain one or more circumstance descriptions to insert in a message 202. The search engine may be a general-purpose engine such as the Google® search engine, or a more specialized search engine such as the USPTO search engine.

The search may search the web generally and/or specifically identified websites, and the search may use keywords tending to produce search results for a historic time period, for preferred topics, and for particular geographic locations.

During a topical preference accepting step 326, an embodiment accepts at least one topical preference. Topical preferences 330 may be conveyed interactively to an embodiment, through a user interface, or they may be defaults read from a configuration file, for example. Topical preferences 330 may be given as enumerated categories, or in a free form as keywords, again depending on the particular embodiment.

During a topical preference using step 328, an embodiment uses at least one topical preference, e.g., while querying 322 a database or contacting 324 a search engine.

During a geographic location determining step 332, an embodiment determines at least one geographic location, such as a message 202 recipient's location, or an older person's location at the time they were approximately the age of a younger person. A geographic location 336 may be conveyed interactively in an embodiment, through a user interface, may be a default read from a configuration file or from submitted personal history information, or may be determined by geolocation technology using IP addresses and other data, for example. A geographic location 336 determined through user input or configuration file content may be given as an enumerated value from a list such as zip codes or country names, or in a free form as keywords, again depending on the particular embodiment.

During a geographic location using step 334, an embodiment uses at least one geographic location, e.g., while querying 322 a database or contacting 324 a search engine.

During a familial relationship accepting step 338, an embodiment accepts at least one familial relationship description. Familial relationships 342 may be conveyed interactively to an embodiment through a user interface, for example. Familial relationships 342 may be given as enumerated values, or in a free form as keywords, again depending on the particular embodiment.

During a familial relationship using step 340, an embodiment uses at least one familial relationship while filling in a template 352 to form a message 202.

During a presenting step 344, an embodiment presents a user with a draft message 202, which in some embodiments the user may then edit 346 and approve 348 prior to transmission 350 of the message. The message may be transmitted 350 to recipients such as the older person and the younger person whose relationship is a motivation for causing generation of the message 202.

FIG. 4 illustrates some steps from the perspective of a user 104.

During a first age indicating step 402, a user gives a system or device (e.g., handheld device interfacing to a remote system) a first person's age indication 304.

During a second age indicating step 404, a user provides the system or device a second person's age indication 308. The age indications may come from different users, e.g., a grandchild and a grandparent may each enter their own age. Also, the older person's age may be entered first in some cases, while the younger person's age is entered first in other cases. Also, more than two ages may be entered, in at least two ways: multiple ages for a given person entered to provide a sequence of life snapshots; multiple persons' ages entered, such as the ages of two grandparents and a grandchild, or of a grandparent and several grandchildren. Steps 402 and 404 correspond generally to steps 302 and 306, albeit from a different perspective.

During a message getting step 406, a recipient gets a generated message 202, through email, synthesized voicemail, short text message, fax, and/or other electronic transmission mechanism(s). Step 406 may be a result of step 320 and/or step 350.

During a submitting step 408, a person submits a description of their personal history 410 to a system or device, for including in a database 206 for possible use in generating messages 202. For instance, an older person may submit a chronology listing geographic locations and corresponding residence dates, and/or a free-form text anecdote (possibly with attached images/sounds) recalling circumstances from a particular historic period.

During a time difference specifying step 412, a user specifies a maximum time difference 414 for the system to use. In some embodiments, for example, two ages are the "same" if they are within twelve months of each other, unless otherwise indicated. Similarly, unless otherwise indicated two ages are "approximately" the same if they are within three years of each other. Historic time period spans may also be specified 412, effectively setting the maximum time difference between a given circumstance's occurrence date and the time at which the older person was the younger person's age.

During a topical preference specifying step 416, one or more topical preferences are specified for circumstance descriptions used to tailor messages 202. Step 416 corresponds with step 326 in the ways topical preferences can be conveyed to a system.

During a geographic location specifying step 418, one or more geographic locations are specified for tailoring messages 202. Step 418 corresponds with step 332 in the ways geographic locations can be conveyed to a system.

During a circumstance choosing step 420, a user chooses for inclusion in a message 202 at least one circumstance description 422 from a list 424 of circumstance descriptions that is displayed 426 by a system 102 directly or through a remote device 212. The list 424 may be in the form of a drop-down list, links, editable text, selectable photos, or an audible recitation, for example. The list 424 may include entire circumstance descriptions, or mere summaries or excerpts of the circumstance descriptions that are available for insertion in the message. The list (like other system output) may be displayed 426 visually on a screen, tactilely on a Braille output peripheral, or audibly through a speaker, for example. The user's choice(s), like other system input, may be entered in the system or device by the user through a touch screen, mouse, voice command, or other input mechanism. The circumstances offered to the user may be selected 314 by the system as discussed above, obtained by database query 322 and/or from web search engine 208 results, for example, may include personal history info 410, and may be selected based in part on topical preference(s) 330 and/or geographic location(s) 336.

During an instructing step 428, a user instructs a system (possibly via a remote device) to transmit a message 202 on a particular transmission date 430, e.g., a birthday. The transmission date is not necessarily the same as the date(s) on which the message 202 is generated 320. A system may be instructed to transmit a message 202 to different recipients on different dates. The transmission date may be specified directly in a calendar format (e.g., Jan. 1, 2010, or "3 days from today"), or the transmission date may be specified in a symbolic format (e.g., "Grandma's Birthday" or "Pat and Mike's Anniversary").

During respective steps, a user reviews 432, approves 434 for transmission (to a recipient or a printing service), and/or edits 436 a message 202, which may be a draft message and is thus not necessarily complete or in the final form seen by recipients. Review 432 may include visually and/or audibly receiving the message 202 from the system, possibly through a remote device. Approval 434 or disapproval may be indicated by a button press, mouse click, voice command, or other input mechanism. Editing 436 may include choosing 420 a circumstance, specifying time differences, topical preferences, and/or geographic locations, altering a template 352 into which selected 314 circumstance descriptions are placed, specifying recipient addresses, and/or adding personalizing text, images, voice recorded greetings or other sounds, for example.

During an addressing step 438 a user addresses a message 202 to multiple people in a family group 440. Recipients may be identified to the system by their email addresses or phone numbers directly, or recipients may be specified symbolically by name or relationship, e.g., "Bobby" or "My Grandkids".

Some embodiments provide a method of producing a tailored intergenerational historic snapshot message 202, including the steps of: obtaining 302 an indication 304 of a first person's age (e.g., an older person); receiving 306 an indication 308 of a second person's age (e.g., a younger person); identifying 310 a historic time period 312 in which the older person was the same age as the younger person's received age (which is not necessarily the younger person's current age); selecting 314 at least one circumstance 316 having an occurrence date 318 in the historic time period; and automatically generating 320 a tailored intergenerational historic snapshot message 202 (possibly in draft form subject to approval and editing) that discloses via a circumstance description that the selected circumstance occurred when the older person was approximately the younger person's age.

In some embodiments, the indication 304, 308 of a person's age is given in years. In some, the indications are obtained in a different order than the order illustrated in FIG. 3. In some embodiments, the historic time period 312 satisfies at least one of the following conditions: it is not greater than two months, not greater than six months, not greater than one year, not greater than two years, not greater than five years, not greater than ten years. In some, selecting 314 at least one circumstance includes querying 322 a database and/or contacting 324 a web search engine. In some, the embodiment selects a circumstance based at least in part on a user-specified topical preference 330 and/or user-specified geographic location 336. Some embodiments present 344 the message to a user for editing and/or approval. The message may be electronically transmitted 350 by a given embodiment to at least the younger person, and in some cases is transmitted to other people as well. The message may disclose, by text, graphics or audible display, a familial relationship between the older person and the younger person.

Some embodiments provide a method of requesting a tailored intergenerational historic snapshot message 202, including the steps of: directly or indirectly giving 402 a system 102 an indication of a first person's current age (e.g., the older person); providing 404 the system with an indication of a second person's current age (e.g., the younger person); and then getting 406 from the system a tailored intergenerational historic snapshot message (possibly in draft form) which discloses when displayed that a particular selected circumstance 316 occurred when the older person was approximately the younger person's current age.

Some embodiments include submitting 408 to the system personal history information of the older person for potential inclusion in the automatically generated message 202 as a circumstance description. Some include specifying 412 to the system how close in time the particular circumstance should be to a date when the older person was the younger person's current age. Some include specifying 416 to the system a topic 330 to be used in selecting the particular circumstance, such as for example, a topic in at least one of the following topic categories: sports, technology, music, films, fine arts, literature, famous people, war, crime, exploration, fashion, automobiles, transportation, engineering, politics, economics, books, law, science, business, religion, philosophy, travel, food, adventure, hobbies. Some embodiments include specifying 418 to the system a geographic location 336 to be used in selecting the particular circumstance. In some embodiments, a user chooses 420 one or more particular circumstances from a list 424 displayed by the system. Some include instructing 428 the system to send the message on a date that is the birthday of at least one of the following: the younger person, the older person, a person instructing the system. Some include reviewing 432 the message 202 and then approving 434 the message, in response to an inquiry from the system; some include editing 436 the message before it is sent to the younger person. Some embodiments allow a user to address 438 the message to multiple people in a family group.

FIGS. 5 and 10-12 illustrate some steps for producing a photo book 504 or a customized card 1000 which contains a generated 320, 502 message. Step 502 is an example of step 320, tailored for use with photo books 504 by virtue of being part of a photo book creation software 128 tool and similarly tailored for use with customized cards 1000 by virtue of being part of a card creation software 128 tool. Instead of displaying a draft message in email format, for example, a photo book tool allows users to place 506 the draft message in a photo book preview 550, and to edit 436 the message in that context, with the photo book preview updated to display 508 changes in message location and/or message content as the user 104 lays out and edits the photo book. Likewise, a card tool allows users to place 506 the draft message in a card preview 550, and to edit 436 the message in that context, with the card preview updated to display 508 changes in message location and/or message content as the user 104 lays out and edits the card 1000.

For example, the user may split 510 a message 202 text across multiple photos 544 and/or split 512 the message 202 text across multiple pages in the photo book 504 or card 1000. The user 104 may use 514 a piece of the message 202 text as a photo caption 518 and/or as a book title 520. The user may also tie 522 message 202 text to a dedication 524 in the book, either by including the message on the dedication page or by dedicating the book to a person who is a subject of the messaged 202 text, such as a person whose age parameter was obtained 302, 306. Likewise, the user may tie 522 message 202 text to text in a card and/or incorporate message 202 into such text, such as text 1004 on a front page 1002 of a card 1000, text on a left interior page 1102L of a card or a right interior page 1102R of a card 1000, or text on the back page 1202 of a card 1000. Text 1004, 1104, 1106, 1204 in a card 1000 may be conventional text (e.g., poems/prose, legal notices), or message text, or a combination of conventional text and message 202 text.

As one of many possible examples, the message 202 text above could be edited and placed in a card 1000 as follows. On the front page, a title is "Grandpa Ferral's birthday: Memories to Katherine from Dad" and narrative text includes "Katherine, with your Grandpa Ferral's birthday just 6 days away, I thought you might like to know some of the ways the world has changed since Grandpa Ferral was your age." On the left interior page 1102L, narrative text includes "When Grandpa Ferral was 17, in 1934, the Central Park Zoo was opened in New York City." On that page 1102L, a photo of young Ferral is captioned "Grandpa Ferral in 1934" and a zoo photo is captioned "Central Park Zoo". On the right interior page 1102R, a photo of a poster advertising the show Anything Goes is captioned "Original production of Anything Goes opened". On the back page 1202, the text of the message 202 concludes, as "The world changes, but your Grandpa Ferral will always be proud of you. Love, Dad".

Figures 6, 7:
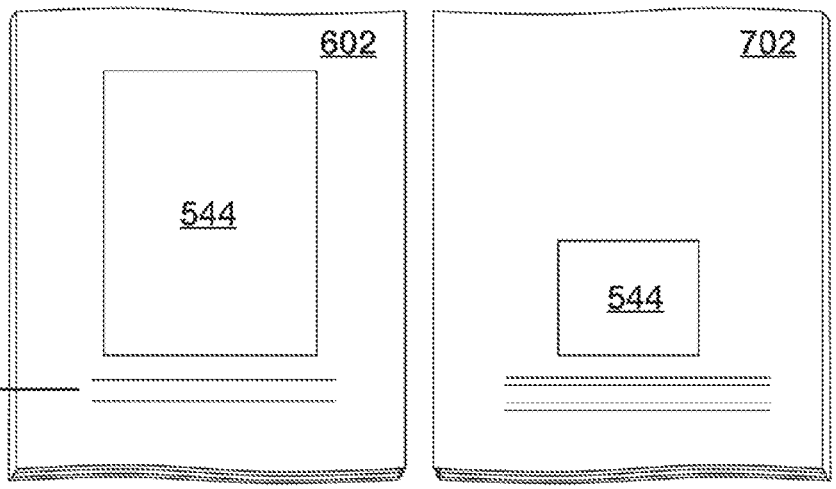
FIG. 6 is a diagram illustrating one of many possible layouts for a photo book front cover.
FIG. 7 is a diagram illustrating one of many possible layouts for a photo book back cover.
Figure 8:
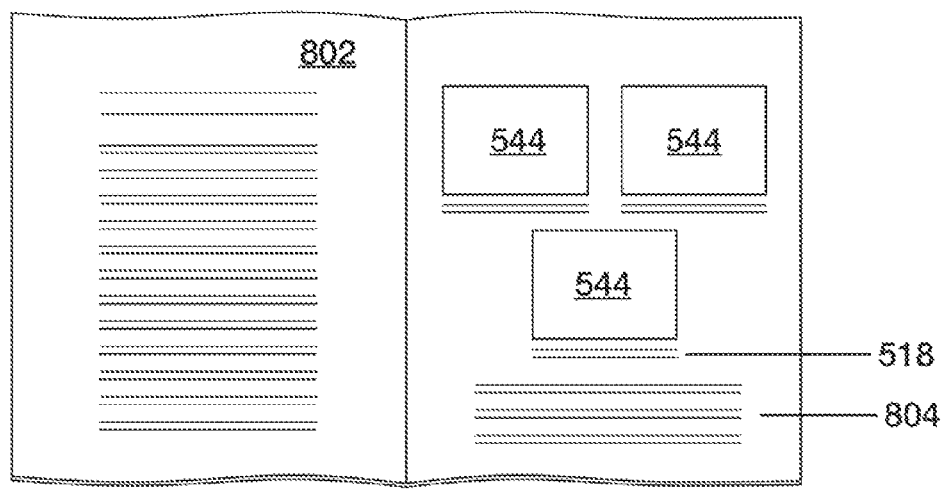
FIG. 8 is a diagram illustrating one of many possible layouts for a photo book dedication page and adjacent interior page.
Figure 9:
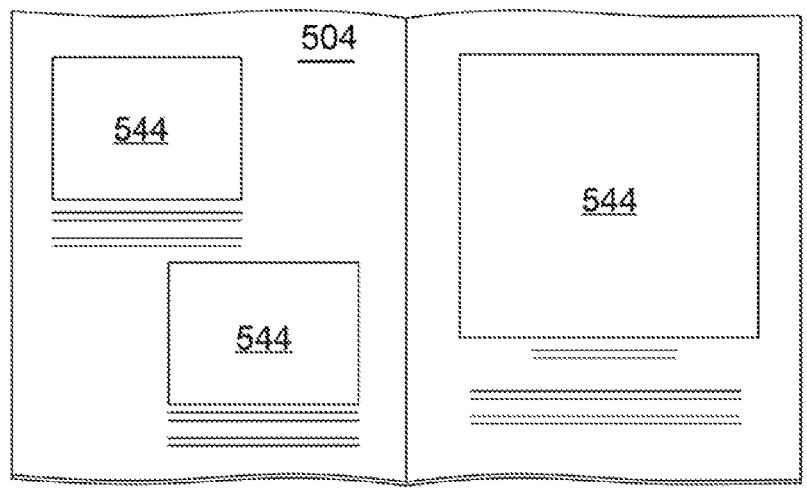
FIG. 9 is a diagram illustrating one of many possible layouts for two interior pages of a photo book.
Figure 10:
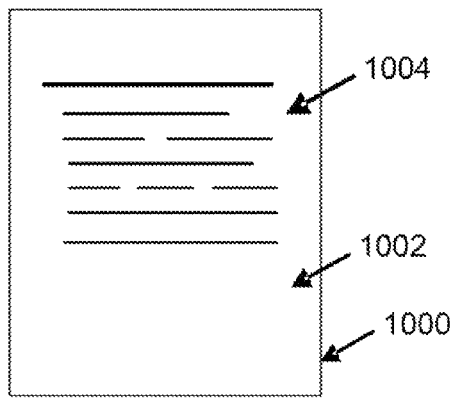
FIG. 10 is a diagram illustrating one of many possible layouts for a customized card front page.
Figure 12:
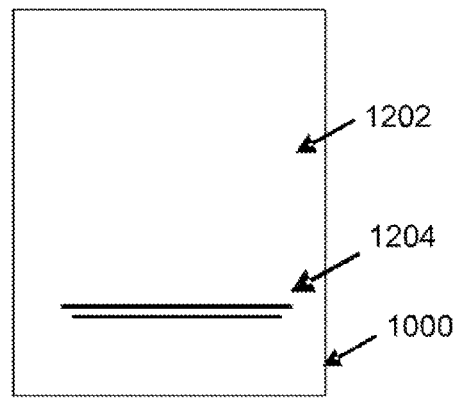
FIG. 12 is a diagram illustrating one of many possible layouts for a customized card back page.
Figure 11:
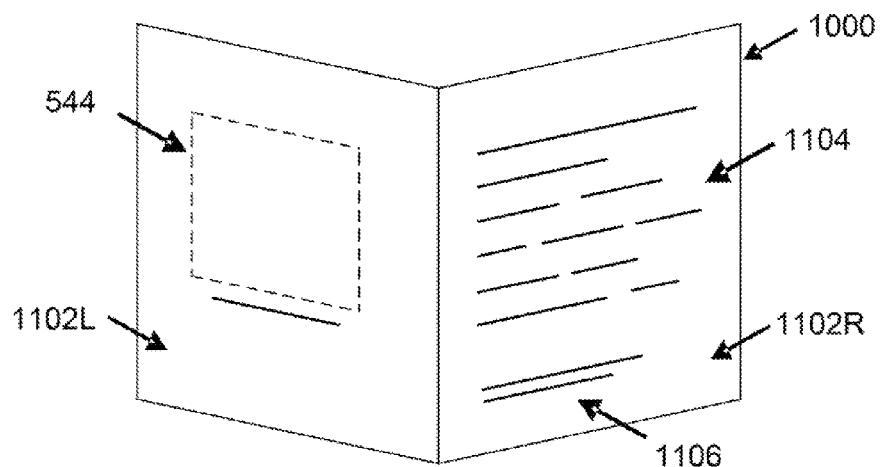
FIG. 11 is a diagram illustrating some of the many possible layouts for a customized card interior.

FIGS. 6 through 9 further illustrate photo books in which messages 202 are embedded. The text is indicated in these figures (and in FIGS. 10-12) as straight lines, and is for illustrating one of many possible layouts. FIG. 6 illustrates one of many possible layouts for a photo book 504 front cover 602. The title 520 may be entirely user-generated, or it may be part of generated 502 message text. FIG. 7 illustrates one of many possible layouts for a photo book 504 back cover 702, with a photo 544 and a text caption 518 located below the photo 544. The caption may be part or all of a message 202 text. FIG. 8 illustrates one of many possible layouts for a photo book dedication page 802 and an adjacent interior page (shown to the right of the dedication page in this example). Three photos 544 are indicated (by actual photos or by placeholders) on the interior page, with respective captions 518. Narrative text 804 is also indicated. These particular captions and narrative text may each be entirely user-generated, or one or more of them may be part of generated 502 message text. FIG. 9 illustrates one of many possible layouts for two interior pages of a photo book, with three captions and one block of narrative text (bottom of right-hand page). Again, the captions and narrative text may each be user-generated or be at least partially automatically generated 502 message text.

With regard to all drawing figures, some embodiments obtain 302, 306 digital values for parameters of a tailored historic snapshot message template data structure 352 stored in a computer-readable memory 112. The template data structure has predefined text and parameters, and the text is interleaved with the parameters to form sentences. In some embodiments, the predefined text and parameters of the template data structure including at least one of the following pairs within a sentence: "from where you are" and a distance parameter, "was your age" and a familial relationship parameter, "when she/he turned" and a person's age parameter, "like to know" and a person's name parameter, "in the year" and a date parameter based on an elder person's birthdate and a younger person's age, "people in it" and a historic date population parameter, "population of" and a historic date population parameter, "just . . . invented" and a historic event parameter with the ellipsis representing text rather than being literal, "first successful" and a historic event parameter, "world . . . changed" and a person's age parameter, with the ellipsis representing text rather than being literal, "world . . . changed" and a person's age parameter, with the ellipsis representing text rather than being literal.

Some embodiments include generating 320, 502 by execution of code with a computer processor a tailored historic snapshot message from the parameters and the template data structure. Some include a user 104 selecting 526 a photo book or customized card layout 528, e.g., as a layout template 530 or as a previously laid-out book or card to be edited. Likewise, some include receiving 526 a user selection of a layout 528. Some embodiments include a user selecting 532 (or likewise, a system receiving 532 a selection of) printing materials 534, such as paper, plastic, leather, foam rubber, cloth, and so on. Some embodiments include a user selecting 532 (or likewise, a system receiving 532 a selection of) non-book non-card items 536 to be printed on, such as mugs, yoga mats, T-shirts, and so on.

Some embodiments include receiving 538 a user selection of at least one photo for the book or card. Some include a user placing 540 a photo that has been selected (or likewise, receiving 540 a photo placement). Some allow users to edit 542 photos, by cropping, resizing, running graphical filters, posterizing, or generally performing a digital photo manipulation of the kind routinely done with Adobe PhotoShop® software (mark of Adobe, Inc.) or similar tools. Some render 546 a preview 550 of the book or card for a user to view 548 on a display 214. Some allow users to select 552 text formatting 554 data such as fonts, font sizes, font styles, and alignment (and likewise receive 552 such selections) for displaying the message 202 text. Some include the photo(s) 544 and a version of the tailored historic snapshot message 202 in an electronic version 560 of the photo book or custom card, which may be sent to a printing service to print 556 tangible books or cards 558.

Some embodiments split 512 the message across multiple pages of the photo book or card, that is, the message spans at least two pages. In some, the message is split 510 across multiple photos of the photo book or card, by using at least a respective portion of the message as at least one of the following for each respective photo: a caption, a heading, a watermark, a displayed label, a text displayed on at least two sides of the photo. Some embodiments use 514 at least a portion of the message as a photo caption in the photo book or card. Some use 516 at least a portion of the message as a title of the photo book or opening line on the card 1000. Some include at least a portion of the message on a back cover of the photo book or back page of the card 1000, and some include at least a portion of the message on a dedication page of the photo book.

In some embodiments, the photo book or card includes a photo 544 of at least one of the following: the elder person, the younger person, a person whose age parameter is obtained in the obtaining step, the historic event.

Some embodiments involve sending 562 the electronic version of the photo book or card to a printing service with an instruction to print at least one tangible copy 558, 566 of the photo book or card. A resulting tangible custom book or card may be mailed to recipients, or picked up at a retailer, such as a retail chain store, for example. Some approaches customize to a group of people, rather than a single person; hence, a user may wish to have multiple copies printed.

Some embodiments involve selecting 526 a layout template 530 of the photo book or card which specifies at least one background image and specifies at least one location in which text is permitted, and the message 202 text appears in at least one location permitted by the layout template. Clip art may be entered as photos 544, in addition to camera-based photos, in some embodiments.

In some embodiments, the user enters a selection 538 of at least one photo for the book or card through a web browser-based user interface 216. In some embodiments, user selections, edits, template parameters, and other data are alternatively entered through an app 128, such as a smartphone app, table app, or laptop app.

In some embodiments, the user places 506 the message on at least one non-book non-card item 536, such as a mug, mat, article of clothing, plaque, or other item. The message may also be placed 506 in an email, or in a gift card 1000 which accompanies a gift (the gift itself does not necessarily bear the message, but it may).

In some embodiments, the photo book 504 or card 1000 includes at least one photo depicting at least one of the following circumstances: a wedding, a moment in the life of a baby (namely, a person less than one year old), a moment in the life of a young child (one less than eleven years old), a family vacation, a travel adventure.

In some embodiments, the photo book 504 is characterized (by the user 104 who supplied the photo, and/or by the photo book generation tool 128 user interface which obtained the template parameters) as belonging to at least one of the following categories: scrapbooks, yearbooks, children's art books, family tree and other family history or genealogy books, autobiographies, biographies, birthday books, "brag" books of achievements, custom recipe books, school memory books, club memory books, team memory books, portfolio books.

Configured Media

Some embodiments include a configured computer-readable storage medium 114, which is an example of a memory 112. Memory 112 may include disks (magnetic, optical, or otherwise), RAM, EEPROMS or other ROMs, and/or other configurable memory. The storage medium which is configured may be in particular a removable storage medium 114 such as a CD, DVD, or flash memory. A general-purpose memory 112, which may be removable or not, and may be volatile or not, can be configured into an embodiment using items such as a message generator 124, message generation source data 204, and/or tailored intergenerational historic snapshot messages 202, in the form of data 118 and instructions 116, read from a removable medium 114 and/or another source such as a network connection, to form a configured medium. The configured memory 112 is capable of causing a computer system to perform method steps for generating and/or requesting tailored intergenerational historic snapshot messages as disclosed herein. FIGS. 1 through 5 thus help illustrate configured storage media embodiments and method embodiments, as well as system and method embodiments. In particular, any of the method steps illustrated in FIGS. 3-5, or otherwise taught herein, may be used to help configure a storage medium to form a configured medium embodiment.

Additional Examples

As discussed above, some embodiments include or provide a message 202 that is automatically generated in one or more of the following formats: email message, cell phone text message, synthesized voice recording, online instant message, visual text and graphics. Some embodiments include or operate on circumstance 316 description which includes a textual, visual, and/or audible portion. Some embodiments use recorded anecdotes, photographs supplied by a user, and/or text supplied by a user, when generating messages 202. During a circumstance choosing step 420 of some embodiments, a user chooses for inclusion in a message 202 at least one circumstance description 422 from a list 424 of circumstance descriptions that is displayed 426 by a system 102 directly or through a remote device 212. The list 424 may be in the form of a drop-down list, links, editable text, selectable photos, or an audible recitation, for example. A list may be "displayed" by a system visually, audibly, and/or tactilely. Some embodiments allow a user to edit the automatically generated message 202.

As a particular example, some embodiments include or produce one or more of the following in which a message 202 is embedded, printed, displayed, or otherwise contained: photo book 504, card 1000 (e.g., holiday card, birthday card, anniversary card, graduation card, congratulations card, gift card, greeting card), invitation, announcement, stationery, print, poster, calendar, personalized website which contains the message 202 or contains a link to click-through to a copy of the message 202. Books 504 or cards 1000 may be wholly electronic books or cards 560, wholly tangible (i.e., non-electronic) books or cards 558, or both tangible and electronic in nature (e.g., a paper bound book or cardboard card containing an electronic component that plays music or recites a recorded message 202).

Some examples of photo books 504 and cards 1000 include user-customized photo books and cards in which a user provides photos to be included in the book or card. In some examples, users can add, move, and resize pictures and text anywhere within the book or card. In some books and cards the message 202 is split across two or more pages; in some, part of the message 202 serves as a title for the book. Some photo books or cards include photos depicting circumstances such as a wedding, moments in the life of a baby or young child, family vacation, or travel adventure. Some include a user-supplied title on the front page, and some include the message 202 printed on an inside cover, interior page, back cover, back page, dedication page, or other page of the photo book or card.

Some additional examples of photo books 504 that can be enhanced with messages 202 as taught herein include scrapbooks, yearbooks, children's art books, family tree and other family history or genealogy books, autobiographies, biographies, birthday books, "brag" books of achievements, custom recipe books, school memory books, club memory books, team memory books, portfolio books, and other books.

In particular, messages 202 may be used in some embodiments to enhance paper and/or digital books or cards such as those capable of being printed by commercially available services, among them those offered at these or other websites: www dot snapfish dot com, www dot shutterfly dot com, www dot blurb dot corn, shop dot costco dot corn slash Photo-Center slash mypublisher-photobooks, www dot vio-vio dot corn, smilebox dot corn, egreetings dot corn, mycardmaker dot corn, and americangreetings dot corn. Note that these web addresses have been reformatted to avoid their accidental use as live links from this patent document, and that the content of these websites is not intended to be incorporated by reference through these web addresses into this patent document. Some subject matter discussed on the websites is also discussed herein, such as the existence of photo book creation and printing services generally.

Books, cards, plaques, customized clothing articles, and other items may be printed 556 with a message 202 in various ways. As used herein, a message may be "printed" using lithography, embossing, engraving, carving, laser printing technology, ink jet technology, 3D printing technology, silk screening, wood burning, etching, handwritten text (calligraphic or otherwise), chemical or digital photography, selection of LEDs, display on a digitally-controlled screen or in another array of pixels, and/or any other technology which produces a human-readable text. Some embodiments tattoo a message 202 on a person's skin; some include skywriting provided with an airplane or other aerial vehicle.

Some embodiments include software operating through a web browser 128 on a laptop or workstation or other computer 102, or software 128 executing on a smartphone 102 or a tablet 102 as an app, which helps a user create a message 202 that will help strengthen family bonds between generations. Some embodiments help people 104 easily create 320, 502 messages for special occasions to help younger people understand the history their older family members have lived through.

For instance, with the assistance of one embodiment a father could easily create 320, 502 a message 202 like the following for his daughter about her grandfather, automatically building on the daughter's specific interests in animals and theater, and automatically taking into account the specific ages of the people involved:
To: Katherine
From: Dad
Subject: Grandpa Ferral's birthday
Katherine, with your Grandpa Ferral's birthday just 6 days away, I thought you might like to know some of the ways the world has changed since Grandpa Ferral was your age. When Grandpa Ferral was 17, in 1934, the Central Park Zoo was opened in New York City, and the original production of Anything Goes opened at the 46$^{th}$ Street Theater. The world changes, but your Grandpa Ferral will always be proud of you.
Love, Dad In addition to or rather than being emailed or otherwise transmitted electronically, this entire message, or the body of this message, or the To: and From: portions plus the body, could also be printed 556 on paper, plastic, leather, cardboard, stock, and/or other materials in a customized photo book 504 or customized card 1000, together with photos 544 selected 538 by the Father (in this example, the Father is a user 104 of the innovation). Photos 544 may be in the form of PDF, TIFF, JPEG, or other graphics-format-capable files, for example, or hyperlinks to such files, or file system directory and filename information identifying such files.

One approach for creation of such messages 202 is illustrated, for example, in the following discussion of a smartphone, web-based, or other application ("app") software 128. After a splash screen, the app 128 introduces itself to the user with text such as this:
Welcome! This patented tool helps you easily create personalized notes to your loved ones for birthdays, anniversaries, graduations, holidays, and other special events. Each note is automatically filled by the tool with historic facts that are chosen based on each individual's interests. These easy-to-make notes help remind your loved ones that even though the world has changed, their family relationships are stronger than ever.

The app 128 follows design principles meant to make it friendly to seniors and people who are relatively unfamiliar with computing devices 102. For example, each screen has a contextual label at the top. One screen is labeled Home, and has buttons labeled See a tutorial, Create a note, View people, View events, Something else. A "note" in the app is an examples of a messages 202. Screens prompt users 104 for input, instead of simply presenting buttons and assuming that the user knows an action by them is being requested, e.g., by displaying "What would you like to do?" Buttons are large and/or separated physically on the screen. A catch-all help button is always available in some embodiments. Often that button is labeled Get help; in this screen the catch-all help button is labeled Something else.

For this example, assume the user 104 presses Create a note. A screen then asks the user to Select people and Select an event. The user presses Select people. A screen says "Sorry, there are no people yet in your address book. What would you like to do?" This is the first time the user has used the app, so the address book is empty. The app offers the user two ways to add people to the address book, displaying buttons labeled Import contacts and Enter a contact. The user can import 402, 404 a list of contacts from another program, or the user can enter a contact directly by typing (or in some versions of the app by speaking the information and having the app do speech-to-text conversion). Consistent with the design principle that context-sensitive help is always available, the app also offers a Get help option. Assume the user presses Import contacts.

The app offers the user different sources from which a list of contacts might be imported. For example, in some embodiments the app displays buttons labeled Import email contact list, Import FaceBook® contact list, Import MyHeritage contact list, Import Ancestry.com® contact list (marks of their respective owners). After each attempt to import a contact list, the app reports the status of the import effort, and offers another opportunity in case the user 104 wants to import from several locations in turn. When all contact list imports are done, the user presses Done and the app returns to the Select people screen so that people to receive the note can be selected 438 from the updated address book. That screen of the app displays people the user can select to receive the note which is being created, e.g., "Adam", "Betty", "Carlos", etc. Then the user selects Adam. The app then shows Adam as one of the Selected people. The user wants Adam to be the only person who receives the note, so the user presses Done.

The app returns to the Create note screen, which is updated to show Adam as the person who will receive the note. Although not done in this example, notes containing messages 202 may also be sent 350 to multiple people. Next, the user presses Select event. The app shows a list of the events already known to it, such as "Adam birthday", "Betty birthday", "Carlos-Rose anniversary", and so on. The app also offers the user a way to create a new event. The user chooses Create new event.

A screen asks "What kind of event will this be?" and shows a list of the types of events already known to it, such as Birthday, Graduation, etc. The app also offers the user Other as a way to create a new type. The event types can be tailored to particular audiences, e.g., by listing religious observances, national holidays, culture-specific events, and user-specific events. As one example, the list of event types for a user who is Jewish, is living in the US, and has a niece living in Mexico, and survived a car crash might include Yom Kippur, Fourth of July, Quinceañera, and Air Bag Day. In this example, the user chooses Birthday. The app also asks "Who is at the center of this event?" in response to which the user presses Select people.

The app goes to the Select people screen, the user selects George and presses Done. Then the app goes back to the Create event screen, which is updated accordingly, saying "The new event will be a Birthday with the spotlight on George. The event is August 10 of every year." The app gets the event date, George's birthday date, from the address book entry for George. Because the type of event is Birthday, the app will schedule this as a recurring event that occurs once a year. The user presses Done, and the app returns to the Create note screen with the draft note updated to reflect the selection of George's birthday as the event the note is about.

The app will get additional information to help personalize the note (message 202). First, the app will obtain or confirm 338 relationships between the people involved: the user, the people the user is writing a note to, and the people the user is writing the note about. The user presses Identify relationships. A screen of the app says "Adam is your" and offers son, grandson, nephew, etc. as options. The same or another screen also says "Adam is George's" and offers son, grandson, nephew, etc. as options. The same or another screen also says "George is your" and offers son, grandson, nephew, etc. as options.

More generally, for each pair of people involved in a note (message 202), the app offers a list of relationships to choose from. To reduce user effort, the list is appropriately shortened when gender is known. Gender may be based, for example, on imported MyHeritage™ info, or may be entered by the user. The list for Adam accordingly shows son, not daughter, and so on, as a possible relationship. User effort is also reduced when possible by inferring a relationship. In this example, Adam is the user's son and George's grandson, so the app infers that George is the user's father. With the relationships determined, the user presses Done, and the app returns to the Create note screen with the draft note updated to reflect the relationships.

The app says, "To give the note a historic perspective for Adam, please Select Adam's interests." The user presses Select Adam's interests. Notice that the button label is now specific to Adam, to help the user keep the context in mind when changing screens. The app shows a scrollable list or other selection menu of topics that Adam might be interested in. Each topic has an associated stock of historic facts which are used 328 to customize the notes generated with the app. The list of available topics can be tailored to particular audiences, based for example on age, gender, religious affiliation, GPS-determined location 336, contact-address-determined location 336, and other criteria. The user may be offered an opportunity for in-app purchase of particular topics and their associated stock of historic facts. After selecting Animals and Cars as topics of interest to Adam, the user presses Done. Based on the information obtained, the app 128, 124 generates and displays a draft note 202 for the user to review.

The app provides a user-editable 436 draft of the note 202. The note is tailored to the three people involved and their relationships, and to the interests of the note's recipient Adam. In this particular example, the body of the note is as follows:
Adam, with your Grandpa George's birthday just 6 days away, I thought you might like to know some ways the world has changed since Grandpa George was your age. When Grandpa George was 17, in 1934, the Central Park Zoo was opened in New York City, and the Nash Motor Company produced its 1,000,000$^{th}$ car. The world changes, but your Grandpa George will always be proud of you. Love, Dad After reviewing 432 the draft, the user presses Done. After the user finishes reviewing the draft and presses Done the app offers the user several choices: Send to Adam, Make changes, Save for later, Get help. The user presses Send to Adam, and the app sends 350 the note to Adam by email, or includes the note in the book to be printed (paper 558 or PDF form 560), or includes the note in the gift card being sent, or includes the note as a message 202 in another format described herein. Because the user has not turned off Send me a copy in the Settings screen, the app will also send the user a copy of the note by email. Then the app returns the user to the Home screen.

Some apps 128 execute on an iPhone® platform 212, and other embodiments use Android phones 212, other smartphones 212, iPad® platforms 212 (marks of Apple, Inc.), other tablets 212, laptops 212, workstations 212, and other computers 102, 212 running web browsers and/or other user interfaces 216 of software 128, 124 that performs one or more of the methods described herein. For example, some embodiments assist users in creating photo books 504 or cards 1000 using a web browser—based interface to select 538 and place 540 photos 544, to select 526 and customize book and card layouts 528 (sometimes via layout templates 530), to provide the service with information used by the service to generate messages 202 for inclusion in the photo book or card, to edit 436 photo book or card messages 202, to render 546 preliminary versions 550 of the photo book or card, to order 562 copies 566 of the photo book or card, to edit 506, 514, 516, 526, 532, 538, 540, 542, 552 the photo book or card, to pay 564 for the photo book or card publication, and/or to perform related operations, e.g., any operations noted herein.

Some embodiments print 556 a message 202 on, in, or as part of an item 536 other than a photo book 504, 558, 560 or card 1000, 558, 560. Some of the suitable items 536 include coffee cups, mugs, clothing (T-shirts, hats, coats, shoes, and other apparel), purses, backpacks, satchels, bags, suitcases, attaché cases, boxes, plaques, posters, picture frames, personalized gifts of other kinds, yoga mats, placards, signs, benches, chairs, desks, doors, umbrellas, reflective car shades, mirrors, and memorials, including for example, grave markers and memorials for deceased loved ones. In some embodiments one of the "persons" is a dog, cat, other household pet, or a horse or other animal that received human care and affection.

Some embodiments provide assistance in creating text for use in photo books, use in cards, and/or use with other items customized by text (and possibly also customized with photos). A user inputs information about a person's interests, a place, or a thing that the user selects to help annotate or accentuate a photo book or any other photographic output. Based on information provided about a person, information could be generated to go along with photos or graphics to put on gifts or memorabilia items such as photo books, cards, framed photos, photo calendars, posters, t-shirts, coffee mugs, and other items one can have custom printed.

One vein of generated information is historical facts, another is in-depth facts on a topic (these veins may overlap). An example of using historical facts could arise, for example, is a user has pictures of a trip to New York City with a daughter who loves the theatre and nature. With photos taken on Broadway, information about the theatre portrayed could be provided to insert in the customizing text. Photos in Central Park could be annotated with historical data about the park. A photo from the zoo showing a giraffe could prompt a user to type in "giraffe" as a parameter, leading the system to provide a list of choices of information about giraffes, such as where they originated, what they eat, their scientific name, and so on. Another example could be quotes from famous people, or general sayings, on topics such as "graduation" for a graduation photo.

CONCLUSION

Although particular embodiments are expressly illustrated and described herein as methods, as configured media, or as systems, it will be appreciated that discussion of one type of embodiment also generally extends to other embodiment types. For instance, the descriptions of methods in connection with FIGS. 3-5 also help describe configured media, and help describe the operation of systems, devices, and articles like those discussed in connection with FIGS. 1, 2, 6-12. It does not follow that limitations from one embodiment are necessarily read into another. In particular, methods are not necessarily limited to the data structures and arrangements presented while discussing systems or articles of manufacture such as configured memories or customized items.

Not every item shown in the Figures need be present in every embodiment. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or methodological acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A method of producing a customized card containing a tailored intergenerational historic snapshot message, the method comprising the steps of:
    obtaining digital values for parameters of a tailored historic snapshot message template data structure stored in a computer-readable memory, the template data structure having predefined text and parameters, the text being interleaved with the parameters to form sentences, the predefined text and parameters of the template data structure including at least one of the following pairs within a sentence:
        "from where you are" and a distance parameter,
        "was your age" and a familial relationship parameter,
        "when she/he turned" and a person's age parameter,
        "like to know" and a person's name parameter,
        "in the year" and a date parameter based on an elder person's birthdate and a younger person's age,
        "people in it" and a historic date population parameter,
        "population of" and a historic date population parameter,
        "just . . . invented" and a historic event parameter with the ellipsis representing text rather than being literal,
        "first successful" and a historic event parameter,
        "world . . . changed" and a person's age parameter, with the ellipsis representing text rather than being literal;
    generating by execution of code with a computer processor a tailored historic snapshot message from the parameters and the template data structure; and
    including a version of the tailored historic snapshot message in an electronic version of the customized card, the customized card containing text tailored for at least one of the following subjects: an anniversary, a birthday, a congratulation, a gift, a graduation, a seasonal greeting, a holiday, an expression of sympathy.

2. The card production method of claim 1, wherein the including step comprises splitting the message across multiple pages of the card.

3. The card production method of claim 1, wherein the card includes visual images, and the including step comprises splitting the message across multiple visual images of the card, by using at least a respective portion of the message as at least one of the following for each respective visual image: a caption, a heading, a watermark, a displayed label, a text displayed on at least two sides of the visual image.

4. The card production method of claim 1, wherein the including step comprises using at least a portion of the message as a visual image caption in the card.

5. The card production method of claim 1, wherein the including step comprises using at least a portion of the message as an opening line of the card.

6. The card production method of claim 1, wherein the including step comprises including at least a portion of the message on a back page of the card.

7. The card production method of claim 1, wherein the including step comprises including at least a portion of the message in a customized gift card.

8. The card production method of claim 1, wherein the including step comprises including in the card a photo of at least one of the following: the elder person, the younger person, the historic event.

9. The card production method of claim 1, wherein the including step comprises including in the card a user-edited version of the message.

10. The card production method of claim 1, wherein the including step comprises including in the card a photo and/or a name of a person whose age parameter is obtained in the obtaining step.

11. The card production method of claim 1, further comprising sending the electronic version of the card to a printing service with an instruction to print at least one tangible copy of the card.

12. The card production method of claim 1, further comprising selecting a layout template of the card which specifies at least one location in which text is permitted, and wherein the message text appears in at least one location permitted by the layout template.

13. The card production method of claim 1, wherein the receiving step receives through a web browser-based user interface a user selection of digital values for parameters of the tailored historic snapshot message template data structure.

14. The card production method of claim 1, wherein the receiving step receives through an app-based user interface a user selection of digital values for parameters of the tailored historic snapshot message template data structure.

15. The card production method of claim 1, further comprising placing the message on at least one non-card item.

16. The card production method of claim 1, wherein the including step includes at least a portion of the message in at least one of the following cards which are also designed to be received by multiple recipients: a seasonal greeting card, a congratulatory card.

17. The card production method of claim 1, wherein the card includes text referring to at least one of the following circumstances: a wedding, a moment in the life of a baby (namely, a person less than one year old), a moment in the life of a young child (one less than eleven years old), a family vacation, a travel adventure.

18. The card production method of claim 1, further comprising printing the tailored historic snapshot message on the card using at least one of the following technologies: lithography, embossing, engraving, laser printing, ink jet printing, 3D printing, silk screening.

19. The card production method of claim 1, wherein the message included in the card comprises "was your age" and a familial relationship parameter.

20. The card production method of claim 1, wherein the message included in the card comprises "in the year" and a date parameter based on an elder person's birthdate and a younger person's age.

* * * * *